United States Patent
Moriyama et al.

(10) Patent No.: US 10,689,506 B2
(45) Date of Patent: *Jun. 23, 2020

(54) RESIN COMPOSITION AND RESIN MOLDED BODY

(71) Applicant: FUJI XEROX CO., LTD., Tokyo (JP)

(72) Inventors: Masahiro Moriyama, Kanagawa (JP); Kenji Yao, Kanagawa (JP)

(73) Assignee: EASTMAN CHEMICAL COMPANY, Kingsport, TN (US)

(*) Notice: Subject to any disclaimer, the term of this patent is extended or adjusted under 35 U.S.C. 154(b) by 49 days.

This patent is subject to a terminal disclaimer.

(21) Appl. No.: 15/950,180

(22) Filed: Apr. 11, 2018

(65) Prior Publication Data

US 2019/0031860 A1     Jan. 31, 2019

(30) Foreign Application Priority Data

Jul. 27, 2017    (JP) ................... 2017-145881

(51) Int. Cl.
    *C08L 1/12*       (2006.01)
    *C08L 23/08*      (2006.01)

(52) U.S. Cl.
    CPC ............. *C08L 1/12* (2013.01); *C08L 23/0869* (2013.01); *C08L 2205/03* (2013.01); *C08L 2205/06* (2013.01); *C08L 2205/08* (2013.01)

(58) Field of Classification Search
    USPC ............................................. 524/41
    See application file for complete search history.

(56) References Cited

U.S. PATENT DOCUMENTS

| | | |
|---|---|---|
| 9,605,140 B2 | 3/2017 | Yao et al. |
| 2016/0090473 A1* | 3/2016 | Yao ............................ C08L 1/10 524/40 |
| 2018/0230295 A1* | 8/2018 | Yao ............................ C08L 1/12 |

FOREIGN PATENT DOCUMENTS

JP     2016-069423      5/2016

* cited by examiner

*Primary Examiner* — Terressa Boykin
(74) *Attorney, Agent, or Firm* — JCIPRNET

(57) ABSTRACT

A resin composition contains cellulose acetate (A) having a degree of substitution of about 2.1 or more and about 2.6 or less, a plasticizer (B), a polyhydroxyalkanoate (C), and an olefin-(meth)acrylate copolymer (D).

13 Claims, No Drawings

RESIN COMPOSITION AND RESIN MOLDED BODY

CROSS-REFERENCE TO RELATED APPLICATIONS

This application is based on and claims priority under 35 U.S.C. 119 from Japanese Patent Application No. 2017-145881 filed Jul. 27, 2017.

BACKGROUND (i) Technical Field

The present invention relates to a resin composition and a resin molded body.

(ii) Related Art

In the related art, various resin compositions are provided and used in different applications. Resin compositions are used particularly in, for example, various parts and housings of home appliances and automobiles. Thermoplastic resins are also used in parts, such as housings, of office machines and electrical and electronic devices.

In recent years, plant-derived resins have been used, and examples of plant-derived resins known in the art include cellulose derivatives.

SUMMARY

According to an aspect of the invention, there is provided a resin composition containing cellulose acetate (A) having a degree of substitution of about 2.1 or more and about 2.6 or less, a plasticizer (B), a polyhydroxyalkanoate (C), and an olefin-(meth)acrylate copolymer (D).

DETAILED DESCRIPTION

A resin composition and a resin molded body according to exemplary embodiments of the present invention will be described below.

In this specification, the amount of each component in an object refers to, when there are several substances corresponding to each component in the object, the total amount of the substances present in the object, unless otherwise specified.

Resin Composition

A resin composition according to an exemplary embodiment contains cellulose acetate (A) having a degree of substitution of about 2.1 or more and about 2.6 or less, a plasticizer (B), a polyhydroxyalkanoate (C), and an olefin-(meth)acrylate copolymer (D) (hereinafter also referred to as a "specific copolymer (D)".

Cellulose has high bending elastic modulus because of its high intramolecular and intermolecular hydrogen bonding strength and is possibly used as, for example, an alternative to metal in fields in which resin materials known in the art are difficult to use.

Cellulose, however, has low thermoplasticity and low solubility in organic solvents because of its rigid chemical structure when cellulose is in a non-modified form. It is thus difficult to use cellulose without modification in applications pertaining to molding processes, such as injection molding and cast molding.

Here, there is known a technique for imparting moldability by addition of a plasticizer to cellulose acetate formed by substituting one or more hydroxyl groups of cellulose with one or more acetyl groups.

However, the addition of a plasticizer to cellulose acetate until plasticity becomes sufficient to provide moldability improves fluidity during molding but may tend to reduce the strength of a resin molded body to be produced. Depending on the storage conditions, the components in the produced resin molded body may move to and deposit on the surface of the resin molded body (this phenomena is also referred to herein as bleeding).

A reduced amount of the plasticizer added to cellulose acetate degrades thermoplasticity and decreases fluidity during molding. To improve fluidity, the molding temperature may be increased, but an increased molding temperature may decompose cellulose acetate.

In the related art, there is also an attempt to use a technique for improving fluidity by adding polyhydroxyalkanoate to cellulose ester in addition to an adipic acid ester that functions as a plasticizer.

However, an increased amount of polyhydroxyalkanoate added to improve fluidity may tend to cause phase separation in the resin composition and may even make it difficult to improve fluidity. Such phase separation may cause delamination during formation of a resin molded body.

The reason for this phenomenon is unclear, but supposed to be as described below.

Since cellulose acetate has low compatibility with resin components (hereinafter also referred to as "other resin components") other than cellulose acetate, the domains formed by other resin components tend to have larger areas with increasing amount of other resin components relative to cellulose acetate. The formation of such large domains may tend to cause phase separation at the interfaces between cellulose acetate and other resin components in the resin composition. During formation of the resin molded body, delamination may start at the interfaces between the domains.

The resin composition according to the exemplary embodiment contains cellulose acetate (A) having a degree of substitution of about 2.1 or more and about 2.6 or less (hereinafter also referred to simply as "cellulose acetate (A)"), a plasticizer (B), a polyhydroxyalkanoate (C), and an olefin-(meth)acrylate copolymer (D).

The polyhydroxyalkanoate (C) and the olefin-(meth)acrylate copolymer (D) (specific copolymer (D)) are also referred to hereinafter as "specific polymers".

The resin composition according to the exemplary embodiment has high fluidity because the resin composition contains the polyhydroxyalkanoate (C) and the specific copolymer (D), that is, at least two specific polymers.

The reason for this is unclear but supposed to be as described below.

The polyhydroxyalkanoate (C) and the specific copolymer (D) are considered to be polymers having relatively high compatibility with cellulose acetate. The amount of each specific polymer in the resin composition containing the cellulose acetate (A), the plasticizer (B), and at least two specific polymers is smaller than that in a resin composition containing cellulose acetate (A), a plasticizer (B), and only one specific polymer, given that the total amount of specific polymers is the same in each resin composition.

In other words, the resin composition according to the exemplary embodiment containing plural other resin components is said to be a resin composition containing a small amount of each of other resin components.

The domains that may be formed by other resin components in the resin composition may have larger areas with increasing amount of other resin components added. Since the resin composition according to the exemplary embodiment contains a small amount of each specific polymer, the domain from the polyhydroxyalkanoate (C) and the domain from the specific copolymer (D) if these domains are formed may be small in size.

In the resin composition, the formation of large domains is suppressed accordingly, which may inhibit phase separation that may occur at the interfaces between cellulose acetate and the specific polymers. As a result, the fluidity may be improved.

In the resin composition, two or more specific polymers that have high compatibility with cellulose acetate may effectively reduce the intermolecular interaction caused by the polar groups (e.g., carbonyl groups) of cellulose acetate. As a result, the fluidity may also be improved.

Furthermore, the delamination phenomenon resulting from phase separation may be suppressed during formation of the resin molded body.

The fluidity of the resin composition according to the exemplary embodiment may be improved accordingly.

For the resin composition according to the exemplary embodiment, not only is phase separation in the resin composition suppressed, but also phase separation during molding is suppressed.

The use of the resin composition thus provides a resin molded body in which delamination is suppressed and which has good moldability.

Furthermore, since the amount of each specific polymer is small in the resin composition according to the exemplary embodiment, a resin molded body in which bleeding is suppressed is produced easily.

The resin composition according to the exemplary embodiment will be described below in detail.

Cellulose Acetate (A)

The resin composition according to the exemplary embodiment contains cellulose acetate (A) having a degree of substitution of about 2.1 or more and about 2.6 or less.

Structure

Cellulose acetate is a cellulose derivative in which at least one of the hydroxyl groups of cellulose is substituted with an acetyl group (acetylation). Specifically, cellulose acetate is, for example, a cellulose derivative represented by general formula (1).

General Formula (1)

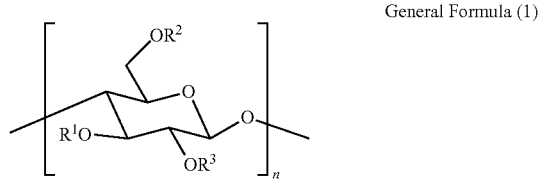

In general formula (1), $R^1$, $R^2$, and $R^3$ each independently represent a hydrogen atom or an acetyl group, and n represents an integer of 2 or more. It is noted that at least one of n $R^1$'s, n $R^2$'s, and n $R^3$'s represents an acetyl group.

In general formula (1), the range of n is not limited and, specifically, n may be, for example, 200 or more and 1,000 or less, preferably 250 or more and 850 or less, and more preferably 300 or more and 750 or less.

When n is 200 or more, the resin molded body may tend to have high strength. When n is 1,000 or less, the resin molded body may be unlikely to have low flexibility.

Weight-Average Molecular Weight (Mw)

The weight-average molecular weight (Mw) of the cellulose acetate (A) may be 40,000 or more, and is preferably 50,000 or more and more preferably 60,000 or more. The upper limit may be 300,000 or less and is preferably 200,000 or less.

The weight-average molecular weight (Mw) is a value determined by gel permeation chromatography (GPC). Specifically, the determination of the molecular weight by GPC is carried out using HLC-8320GPC available from Tosoh Corporation as a measurement apparatus, columns available from Tosoh Corporation, TSKgel GMHHR-M+TSKgel GMHHR-M (7.8 mm I.D., 30 cm), and a chloroform solvent. The weight-average molecular weight (Mw) is calculated from the molecular weight calibration curve created on the basis of the obtained measurement results using a monodisperse polystyrene standard.

Degree of Substitution

The degree of substitution of the cellulose acetate (A) is about 2.1 or more and about 2.6 or less, preferably about 2.15 or more and about 2.6 or less, more preferably about 2.2 or more and about 2.5 or less, and still more preferably about 2.2 or more and about 2.45 or less.

When the degree of substitution is about 2.1 or more, the intramolecular and intermolecular hydrogen bonding strength may be low. As a result, the melting point may tend to be low, and hot melting may occur easily.

When the degree of substitution is about 2.6 or more, however, the substituting acetyl groups may tend to be arranged regularly, which may increase the intramolecular and intermolecular hydrogen bonding strength. As a result, the melting point may tend to be high, and hot melting may be unlikely to occur.

When the degree of substitution is in the above-described range, the fluidity may tend to be improved.

The degree of substitution indicates the degree at which the hydroxyl groups of cellulose are substituted with acetyl groups. In other words, the degree of substitution indicates the degree of acetylation of cellulose acetate. Specifically, the degree of substitution means the average number of hydroxyl groups per molecule substituted with acetyl groups among three hydroxyl groups of the D-glucopyranose unit of cellulose acetate.

The degree of substitution is determined using $H^1$-NMR (JMN-ECA available from JEOL RESONANCE) on the basis of the integration ratio between the peak from hydrogens of cellulose and that from acetyl groups. For example, the molecular weight of the structural unit of cellulose acetate is 263 when the degree of substitution with acetyl groups is 2.4, and 284 when the degree of substitution with acetyl groups is 2.9.

Percentage in Total Amount of Resin Composition

In the resin composition according to the exemplary embodiment, the percentage of the cellulose acetate (A) in the total amount of the resin composition is preferably about 50 mass % or more and about 95 mass % or less, more preferably about 60 mass % or more and about 90 mass % or less, and still more preferably about 75 mass % or more and about 85 mass % or less.

Cellulose acetate (A) may be used alone or in combination of two or more.

Specific examples of cellulose acetate (A) include, but are not limited to, commercial products described below. Specific examples of cellulose acetate (A) include substances formed by modifying the following cellulose acetate such that the degree of substitution is controlled at about 2.1 or more and about 2.6 or less.

Diacetyl cellulose (product name: L-50 available from Daicel Corporation, the substituents $R^1$, $R^2$, and $R^3$ represent a hydrogen atom or an acetyl group)

Diacetyl cellulose (product name: L-20 available from Daicel Corporation, the substituents $R^1$, $R^2$, and $R^3$ represent a hydrogen atom or an acetyl group)

Cellulose triacetate (product name: LT-55 available from Daicel Corporation, the substituents $R^1$, $R^2$, and $R^3$ represent a hydrogen atom or an acetyl group)

Cellulose acetate (product name: CA-398-3 available from Eastman Chemical Company, the substituents $R^1$, $R^2$, and $R^3$ represent a hydrogen atom or an acetyl group)

A method for producing cellulose acetate (A) is not limited. For example, cellulose acetate (A) may be produced by, for example, a method involving subjecting cellulose to acetylation, decomposition into small molecules (depolymerization), and as desired, deacetylation. Alternatively, cellulose acetate (A) may be produced by, for example, decomposing (depolymerizing) commercial cellulose acetate into small molecules so as to obtain a predetermined weight-average molecular weight.

Plasticizer (B)

The resin composition according to the exemplary embodiment contains the plasticizer (B). The plasticizer (B) is a compound that may impart plasticity to the cellulose acetate (A) and refers to a compound other than the polyhydroxyalkanoate (C) and the specific copolymer (D).

Examples of the plasticizer (B) include an adipic acid ester-containing compound, a polyether ester compound, a condensed phosphoric acid ester compound, a sebacic acid ester compound, a glycol ester compound, an acetic acid ester compound, a dibasic acid ester compound, a phosphoric acid ester compound, a phthalic acid ester compound, camphor, a citric acid ester compound, a stearic acid ester compound, metallic soap, a polyol compound, and a polyalkylene oxide compound.

Among these compounds, an adipic acid ester-containing compound and a polyether ester compound are preferred, and an adipic acid ester-containing compound is more preferred.

Adipic Acid Ester-Containing Compound

The adipic acid ester-containing compound (a compound containing adipic acid ester) refers to a compound of only adipic acid ester, or a mixture of adipic acid ester and a component (a compound different from adipic acid ester) other than adipic acid ester. The adipic acid ester-containing compound may contain 50 mass % or more of adipic acid ester relative to the total amount of all components.

Examples of adipic acid ester include adipic acid diester and adipic acid polyester. Specific examples include an adipic acid diester represented by general formula (AE-1) below and an adipic acid polyester represented by general formula (AE-2) below.

In general formulas (AE-1) and (AE-2), $R^{AE1}$ and $R^{AE2}$ each independently represent an alkyl group, or a polyoxyalkyl group $[-(C_xH_{2X}-O)_y-R^{A1}]$ (where $R^{A1}$ represents an alkyl group, x represents an integer of 1 or more and 6 or less, and y represents an integer of 1 or more and 6 or less).

$R^{AE3}$ represents an alkylene group.

m1 represents an integer of 1 or more and 5 or less.

m2 represents an integer of 1 or more and 10 or less.

In general formulas (AE-1) and (AE-2), the alkyl group represented by $R^{AE1}$ and $R^{AE2}$ is preferably an alkyl group having 1 or more and 6 or less carbon atoms, and more preferably an alkyl group having 1 or more and 4 or less carbon atoms. The alkyl group represented by $R^{AE1}$ and $R^{AE2}$ may be a linear, branched, or cyclic alkyl group, and is preferably a linear or branched alkyl group.

In the polyoxyalkyl group $[-(C_xH_{2X}-O)_y-R^{A1}]$ represented by $R^{AE1}$ and $R^{AE2}$ in general formulas (AE-1) and (AE-2), the alkyl group represented by $R^{A1}$ is preferably an alkyl group having 1 or more and 6 or less carbon atoms, and more preferably an alkyl group having 1 or more and 4 or less carbon atoms. The alkyl group represented by $R^{A1}$ may be a linear, branched, or cyclic alkyl group, and is preferably a linear or branched alkyl group. x represents an integer of 1 or more and 6 or less. y represents an integer of 1 or more and 6 or less.

In general formula (AE-2), the alkylene group represented by $R^{AE3}$ is preferably an alkylene group having 1 or more and 6 or less carbon atoms, and more preferably an alkylene group having 1 or more and 4 or less carbon atoms. The alkylene group may be a linear, branched, or cyclic alkylene group, and is preferably a linear or branched alkylene group.

In general formulas (AE-1) and (AE-2), the group represented by each reference character may be substituted with a substituent. Examples of the substituent include an alkyl group, an aryl group, and a hydroxy group.

The molecular weight (or weight-average molecular weight) of adipic acid ester is preferably 100 or more and 10000 or less, and more preferably 200 or more and 3000 or less.

The weight-average molecular weight (Mw) is a value determined by gel permeation chromatography (GPC). Specifically, the determination of the molecular weight by GPC is carried out using HLC-8320GPC available from Tosoh Corporation as a measurement apparatus, columns available from Tosoh Corporation, TSKgel GMHHR-M+TSKgel GMHHR-M (7.8 mm I.D., 30 cm), and a chloroform solvent. The weight-average molecular weight (Mw) is calculated from the molecular weight calibration curve created on the basis of the obtained measurement results using a monodisperse polystyrene standard.

General Formula (AE-1)

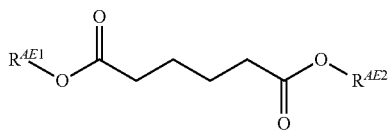

General Formula (AE-2)

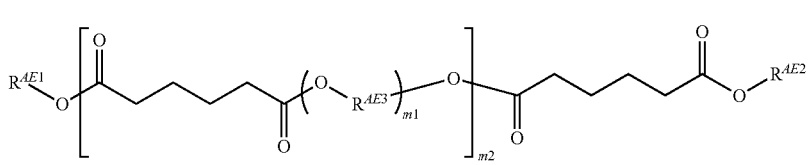

Specific examples of the adipic acid ester-containing compound include, but are not limited to, the following substances.

| Substance Name | Product Name | Manufacturer |
|---|---|---|
| ADP1 | adipic acid diester | Daifatty-101 | Daihachi Chemical Industry Co., Ltd. |
| ADP2 | adipic acid diester | Adekacizer RS-107 | Adeka Corporation |
| ADP3 | adipic acid polyester | Polycizer W-230-H | DIC Corporation |

Polyether Ester Compound

Specific examples of the polyether ester compound include polyether ester compounds represented by general formula (EE).

General Formula (EE)

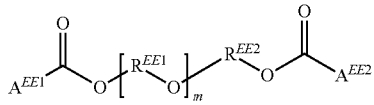

In general formula (EE), $R^{EE1}$ and $R^{EE2}$ each independently represent an alkylene group having 2 or more and 10 or less carbon atoms. $A^{EE1}$ and $A^{EE2}$ each independently represent an alkyl group having 1 or more and 6 or less carbon atoms, an aryl group having 6 or more and 12 or less carbon atoms, or an aralkyl group having 7 or more and 18 or less carbon atoms. m represents an integer of 1 or more.

In general formula (EE), the alkylene group represented by $R^{EE1}$ is preferably an alkylene group having 3 or more and 10 or less carbon atoms, and more preferably an alkylene group having 3 or more and 6 or less carbon atoms. The alkylene group represented by $R^{EE1}$ may be a linear, branched, or cyclic alkylene group, and is preferably a linear alkylene group.

When the alkylene group represented by $R^{EE1}$ has 3 or more carbon atoms, a decrease in the fluidity of the resin composition may be suppressed and the resin composition may tend to exhibit thermoplasticity. When the alkylene group represented by $R^{EE1}$ has 10 or less carbon atoms or the alkylene group represented by $R^{EE1}$ is a linear alkylene group, the polyether ester compound may tend to have high affinity with the cellulose acetate (A). Thus, when the alkylene group represented by $R^{EE1}$ is a linear alkylene group and the number of carbon atoms in the alkylene group is in the above-described range, the resin composition may have high moldability.

From these viewpoints, the alkylene group represented by $R^{EE1}$ may be an n-hexylene group ($-(CH_2)_6-$). That is, the polyether ester compound may be a compound where $R^{EE1}$ represents an n-hexylene group ($-(CH_2)_6-$).

In general formula (EE), the alkylene group represented by $R^{EE2}$ is preferably an alkylene group having 3 or more and 10 or less carbon atoms, and more preferably an alkylene group having 3 or more and 6 or less carbon atoms. The alkylene group represented by $R^{EE2}$ may be a linear, branched, or cyclic alkylene group, and is preferably a linear alkylene group.

When the alkylene group represented by $R^{EE2}$ has 3 or more carbon atoms, a decrease in the fluidity of the resin composition may be suppressed and the resin composition may tend to exhibit thermoplasticity. When the alkylene group represented by $R^{EE2}$ has 10 or less carbon atoms or the alkylene group represented by $R^{EE2}$ is a linear alkylene group, the polyether ester compound may tend to have high affinity with the cellulose acetate (A). Thus, when the alkylene group represented by $R^{EE2}$ is a linear alkylene group and the number of carbon atoms in the alkylene group is in the above-described range, the resin composition may have high moldability.

From these viewpoints, the alkylene group represented by $R^{EE2}$ may be an n-butylene group ($-(CH_2)_4-$). That is, the polyether ester compound may be a compound where $R^{EE2}$ represents an n-butylene group ($-(CH_2)_4-$).

In general formula (EE), the alkyl group represented by $A^{EE1}$ and $A^{EE2}$ is an alkyl group having 1 or more and 6 or less carbon atoms, and more preferably an alkyl group having 2 or more and 4 or less carbon atoms. The alkyl group represented by $A^{EE1}$ and $A^{EE2}$ may be a linear, branched, or cyclic alkyl group, and is preferably a branched alkyl group.

The aryl group represented by $A^{EE1}$ and $A^{EE2}$ is an aryl group having 6 or more and 12 or less carbon atoms. Examples of the aryl group include unsubstituted aryl groups, such as a phenyl group and a naphthyl group; and substituted phenyl groups, such as a t-buthylphenyl group and a hydroxyphenyl group.

The aralkyl group represented by $A^{EE1}$ and $A^{EE2}$ is a group expressed as $-R^A$-Ph. $R^A$ represents a linear or branched alkylene group having 1 or more and 6 or less carbon atoms (preferably 2 or more and 4 or less carbon atoms). Ph represents an unsubstituted phenyl group, or a substituted phenyl group substituted with a linear or branched alkyl group having 1 or more and 6 or less carbon atoms (preferably 2 or more and 6 or less carbon atoms). Specific examples of the aralkyl group include unsubstituted aralkyl groups, such as a benzyl group, a phenylmethyl group (phenethyl group), a phenylpropyl group, and a phenylbutyl group; and substituted aralkyl groups, such as a methylbenzyl group, a dimethylbenzyl group, and a methylphenethyl group.

At least one of $A^{EE1}$ and $A^{EE2}$ may represent an aryl group or an aralkyl group. In other words, the polyether ester compound may be a compound where at least one of $A^{EE1}$ and $A^{EE2}$ represents an aryl group (preferably a phenyl group) or an aralkyl group, and may be a compound where $A^{EE1}$ and $A^{EE2}$ each represent an aryl group (preferably a phenyl group) or an aralkyl group.

Next, the properties of the polyether ester compound will be described.

The weight-average molecular weight (Mw) of the polyether ester compound is preferably 450 or more and 650 or less, and more preferably 500 or more and 600 or less.

When the weight-average molecular weight (Mw) is 450 or more, bleeding (deposition phenomenon) may be unlikely to occur. When the weight-average molecular weight (Mw) is 650 or less, the polyether ester compound may tend to have high affinity with the cellulose acetate (A). Therefore, when the weight-average molecular weight (Mw) is in the above-described range, the resin composition may have high moldability.

In addition, the weight-average molecular weight (Mw) of the polyether ester compound is a value determined by the same measurement method as that for the weight-average molecular weight (Mw) of adipic acid ester as described above.

The viscosity of the polyether ester compound at 25° C. is preferably 35 mPa·s or more and 50 mPa·s or less, and more preferably 40 mPa·s or more and 45 mPa·s or less.

When the viscosity is 35 mPa·s or more, the dispersibility of the polyether ester compound into the cellulose acetate (A) may tend to increase. When the viscosity is 50 mPa·s or less, the dispersion of the polyether ester compound may be unlikely to exhibit anisotropy. Therefore, when the viscosity is in the above-described range, the resin composition may have high moldability.

The viscosity is a value determined with an E-type viscometer.

The solubility parameter (SP value) of the polyether ester compound is preferably 9.5 or more and 9.9 or less, and more preferably 9.6 or more and 9.8 or less.

When the solubility parameter (SP value) is 9.5 or more and 9.9 or less, the dispersibility of the polyether ester compound into the cellulose acetate (A) may tend to increase.

The solubility parameter (SP value) is a value calculated using the Fedors' method. Specifically, the solubility parameter (SP value) is, for example, calculated from the following formula in conformity with the description in Polym. Eng. Sci., vol. 14, p. 147 (1974).

$$\text{SP value} = \sqrt{(Ev/v)} = \sqrt{(\Sigma\Delta ei/\Sigma\Delta vi)} \quad \text{Formula:}$$

(wherein Ev: evaporation energy (cal/mol), v: molar volume (cm$^3$/mol), $\Delta$ei: evaporation energy of each atom or each atomic group, $\Delta$vi: molar volume of each atom or each atomic group).

The unit of the solubility parameter (SP value) is (cal/cm$^3$)$^{1/2}$, but the solubility parameter (SP value) is expressed in a dimensionless form by omission of the unit according to the related art.

Specific examples of the polyether ester compound include, but are not limited to, the following compounds.

polyhydroxyalkanoate (C) may be, for example, a compound having a structural unit represented by formula (I) below.

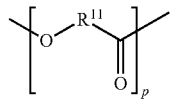

Formula (I)

In formula (I), R$^{11}$ represents an alkylene group having 1 or more and 10 or less carbon atoms, and p represents an integer of 1 or more.

In formula (I), the alkylene group represented by R$^{11}$ is preferably an alkylene group having 3 or more and 8 or less carbon atoms, and more preferably an alkylene group having 3 or more and 6 or less carbon atoms in order to improve fluidity. The alkylene group represented by R$^{11}$ may be a linear, branched, or cyclic alkylene group.

In formula (I), the alkylene group represented by R$^{11}$ may have a substituent.

Examples of the substituent include, but are not limited to, a halogen atom, a nitro group, an amino group, a hydroxyl group, and a carboxyl group.

When p in formula (I) is 2 or more, plural R$^{11}$'s may represent the same alkylene group or different alkylene groups. In other words, the polyhydroxyalkanoate (C) may have 1) a structure where plural R$^{11}$'s all represent the same alkylene group (e.g., a structure having only a structural unit of [—O—R$^{11}$—C(=O)—]) or

|       | R$^{EE1}$ | R$^{EE2}$ | A$^{EE1}$ | A$^{EE2}$ | Mw | Viscosity (25° C.) | APHA | SP Value |
|-------|-----------|-----------|-----------|-----------|-----|--------------------|------|----------|
| PEE1  | —(CH$_2$)$_6$— | —(CH$_2$)$_4$— | phenyl group | phenyl group | 550 | 43 | 120 | 9.7 |
| PEE2  | —(CH$_2$)$_2$— | —(CH$_2$)$_4$— | phenyl group | phenyl group | 570 | 44 | 115 | 9.4 |
| PEE3  | —(CH$_2$)$_{10}$— | —(CH$_2$)$_4$— | phenyl group | phenyl group | 520 | 48 | 110 | 10.0 |
| PEE4  | —(CH$_2$)$_6$— | —(CH$_2$)$_2$— | phenyl group | phenyl group | 550 | 43 | 115 | 9.3 |
| PEE5  | —(CH$_2$)$_6$— | —(CH$_2$)$_{10}$— | phenyl group | phenyl group | 540 | 45 | 115 | 10.1 |
| PEE6  | —(CH$_2$)$_6$— | —(CH$_2$)$_4$— | t-butyl group | t-butyl group | 520 | 44 | 130 | 9.7 |
| PEE7  | —(CH$_2$)$_6$— | —(CH$_2$)$_4$— | phenyl group | phenyl group | 460 | 45 | 125 | 9.7 |
| PEE8  | —(CH$_2$)$_6$— | —(CH$_2$)$_4$— | phenyl group | phenyl group | 630 | 40 | 120 | 9.7 |
| PEE9  | —(CH$_2$)$_6$— | —(CH$_2$)$_4$— | phenyl group | phenyl group | 420 | 43 | 135 | 9.7 |
| PEE10 | —(CH$_2$)$_6$— | —(CH$_2$)$_4$— | phenyl group | phenyl group | 670 | 48 | 105 | 9.7 |
| PEE11 | —(CH$_2$)$_6$— | —(CH$_2$)$_4$— | phenyl group | phenyl group | 550 | 35 | 130 | 9.7 |
| PEE12 | —(CH$_2$)$_6$— | —(CH$_2$)$_4$— | phenyl group | phenyl group | 550 | 49 | 125 | 9.7 |
| PEE13 | —(CH$_2$)$_6$— | —(CH$_2$)$_4$— | phenyl group | phenyl group | 550 | 32 | 120 | 9.7 |
| PEE14 | —(CH$_2$)$_6$— | —(CH$_2$)$_4$— | phenyl group | phenyl group | 550 | 53 | 105 | 9.7 |
| PEE15 | —(CH$_2$)$_6$— | —(CH$_2$)$_4$— | phenyl group | phenyl group | 550 | 43 | 135 | 9.7 |
| PEE16 | —(CH$_2$)$_6$— | —(CH$_2$)$_4$— | phenyl group | phenyl group | 550 | 43 | 105 | 9.7 |
| PEE17 | —(CH$_2$)$_6$— | —(CH$_2$)$_4$— | phenyl group | phenyl group | 550 | 43 | 150 | 9.7 |
| PEE18 | —(CH$_2$)$_6$— | —(CH$_2$)$_4$— | phenyl group | phenyl group | 550 | 43 | 95 | 9.7 |

The amount of the plasticizer (B) is preferably, but not necessarily, about 5 parts by mass or more and about 23 parts by mass or less, and more preferably about 15 parts by mass or more and about 20 parts by mass or less relative to 100 parts by mass of the cellulose acetate (A).

When the amount of the plasticizer (B) is about 23 parts by mass or less, bleeding of the plasticizer may be unlikely to occur. When the amount of the plasticizer (B) is about 5 parts by mass or more, the fluidity may tend to be improved.

The plasticizer (B) may be used alone or in combination of two or more.

Polyhydroxyalkanoate (C)

The resin composition according to the exemplary embodiment contains a polyhydroxyalkanoate (C). The 2) a structure where plural R$^{11}$'s represent two or more different alkylene groups (e.g., a structure having two structural units of [—O—R$^{11A}$—C(=O)—] and [—O—R$^{11B}$—C(=O)—] (R$^{11A}$ and R$^{11B}$ represent different alkylene groups)).

The term "different alkylene groups" refers to alkylene groups different from each other in at least one of the following: the number of carbon atoms; molecular skeleton (e.g., different in shape, for example, linear shape, branched shape, or cyclic shape, or different in the position of branching); and substituent (e.g., the presence or absence, the type, and the position of a substituent).

In other words, the polyhydroxyalkanoate (C) may be a homopolymer of one hydroxyalkanoate (hydroxyalkanoic acid) or may be a copolymer of two or more hydroxyalkanoates (hydroxyalkanoic acids).

In formula (I), the upper limit of p is not limited, and p is, for example, 20,000 or less. For the range of n, n is preferably 500 or more and 10,000 or less, and more preferably 1000 or more and 8000 or less in order to improve fluidity.

Examples of hydroxyalkanoic acids for forming the polyhydroxyalkanoate include lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxycaproic acid, 2-hydroxyisocaproic acid, 6-hydroxycaproic acid, 3-hydroxypropionic acid, 3-hydroxy-2,2-dimethylpropionic acid, 3-hydroxyhexanoic acid, and 2-hydroxy-n-octanoic acid.

To improve fluidity, the polyhydroxyalkanoate (C) is preferably a copolymer of a branched hydroxyalkanoic acid having 2 or more and 4 or less carbon atoms and a branched hydroxyalkanoic acid having 5 or more and 7 or less carbon atoms (the number of carbon atoms is inclusive of the number of the carbon of the carboxyl group). The polyhydroxyalkanoate (C) is more preferably a copolymer of 3-hydroxybutyric acid and 3-hydroxyhexanoic acid (a copolymer of 3-hydroxybutyrate and 3-hydroxyhexanoate).

When the polyhydroxyalkanoate (C) is a copolymer of 3-hydroxybutyrate and 3-hydroxyhexanoate, the ratio ([—O(C$_3$H$_6$)CO—]/[—O(C$_5$H$_{10}$)CO—]) of the structural unit derived from 3-hydroxybutyrate to the structural unit derived from 3-hydroxyhexanoate is preferably, in terms of mass ratio, 80/20 or more and 98/2 or less, more preferably 85/15 or more and 95/5 or less, and still more preferably 87/13 or more and 92/8 or less.

The ratio between the structural units is determined by the following method.

The H$^1$-NMR spectrum is recorded, and the ratio is calculated from the integration ratio of hydrogens at the butyrate terminal to hydrogens at the hexanoate terminal.

The weight average molecular weight (Mw) of the polyhydroxyalkanoate (C) may be 10,000 or more and 1,000,000 or less (preferably 50,000 or more and 800,000 or less, more preferably 100,000 or more and 600,000 or less).

When the weight average molecular weight (Mw) of the polyhydroxyalkanoate (C) is in this range, a resin composition having good fluidity may tend to be obtained.

The weight-average molecular weight (Mw) of the polyhydroxyalkanoate (C) is a value determined by the same measurement method as that for the weight-average molecular weight (Mw) of the cellulose acetate (A) as described above.

Specific examples of the polyhydroxyalkanoate (C) include, but are not limited to, the following substances.

| PHA-1 | poly(3-hydroxybutyrate-co-3-hydroxyhexanoate) [copolymer of 3-hydroxybutyric acid and 3-hydroxyhexanoic acid] |
| PHA-2 | polylactic acid |
| PHA-3 | poly(3-hydroxybutyrate-co-3-hydroxyvalerate) [copolymer of 3-hydroxybutyric acid and 3-hydroxyvaleric acid] |
| PHA-4 | poly(3-hydroxybutyrate) [homopolymer of 3-hydroxybutyric acid] |

The polyhydroxyalkanoate (C) may be a commercial product. Examples of the commercial product include "Aonilex" available from Kaneka Corporation, "Terramac TE2000" available from Unitika Ltd., and "Biopole" available from Zeneka.

The amount of the polyhydroxyalkanoate (C) is preferably about 0.5 parts by mass or more and about 10 parts by mass or less, more preferably about 1 part by mass or more and about 7.5 parts by mass or less, and more preferably about 2 parts by mass or more and about 5 parts by mass or less relative to 100 parts by mass of the cellulose acetate (A).

When the amount of the polyhydroxyalkanoate (C) is about 10 parts by mass or less, the phase separation at the interface between the polyhydroxyalkanoate (C) and the cellulose acetate (A) may be unlikely to occur, and a resin molded body in which delamination is suppressed may tend to be obtained. When the amount of the polyhydroxyalkanoate (C) is about 0.5 parts by mass or more, the fluidity may tend to be improved.

The polyhydroxyalkanoate (C) may be used alone or in combination of two or more.

Olefin-(Meth)Acrylate Copolymer (D)

The resin composition according to the exemplary embodiment contains an olefin-(meth)acrylate copolymer (D) (specific copolymer (D)).

As used herein, the term "(meth)acrylate" refers to both acrylate and methacrylate.

The term "olefin-(meth)acrylate copolymer" refers to a copolymer including a (meth)acrylate partial structure between olefin repeating units.

The olefin-(meth)acrylate copolymer (D) is preferably, but not necessarily, an olefin-alkyl (meth)acrylate copolymer.

Examples of the olefin-(meth)acrylate copolymer (D) include a copolymer including an olefin-derived structural unit and a structural unit represented by formula (a-1) below.

(a-1)

In the formula, $R^{21}$ represents a hydrogen atom or a methyl group, and $R^{22}$ represents a hydrogen atom or an alkyl group having 1 or more and 10 or less carbon atoms.

The structural unit represented by formula (a-1) may be a (meth)acrylate-derived structural unit.

$R^{21}$ in formula (a-1) may be a hydrogen atom.

To improve fluidity, $R^{22}$ in formula (a-1) represents an alkyl group having 1 or more and 10 or less carbon atoms, more preferably an alkyl group having 1 or more and 6 or less carbon atoms, still more preferably an alkyl group having 1 or more and 4 or less carbon atoms, yet still more preferably a methyl group or an ethyl group, and yet still more preferably a methyl group.

The alkyl group in $R^{22}$ may be a linear alkyl group or a branched alkyl group.

The olefin-(meth)acrylate copolymer (D) may have one structural unit represented by formula (a-1) or may have two or more structural units represented by formula (a-1).

To improve fluidity, the amount of the structural unit represented by formula (a-1) in the olefin-(meth)acrylate copolymer (D) may be 15 mass % or more and 45 mass % or less (preferably 18 mass % or more and 35 mass % or less, more preferably 20 mass % or more and 32 mass % or less) relative to the total amount of the olefin-(meth)acrylate copolymer.

The amount of the structural unit is determined by NMR. The same applies to the following description.

The olefin-(meth)acrylate copolymer (D) has an olefin-derived structural unit.

The olefin in the olefin-(meth)acrylate copolymer (D) is preferably an aliphatic hydrocarbon compound having an ethylenically unsaturated group, more preferably at least one compound selected from the group consisting of ethylene and α-olefins, and still more preferably at least one compound selected from the group consisting of ethylene and propylene, and yet still more preferably ethylene.

The olefin-(meth)acrylate copolymer (D) may include, for example, a structural unit represented by formula (b-1) below as an olefin-derived structural unit.

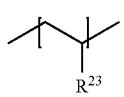

(b-1)

In the formula, $R^{23}$ represents a hydrogen atom or an alkyl group having 1 or more and 8 or less carbon atoms.

To improve fluidity, $R^{23}$ in the formula (b-1) is preferably a hydrogen atom or an alkyl group having 1 or more and 6 or less carbon atoms, more preferably a hydrogen atom or a methyl group, and still more preferably a hydrogen atom.

The alkyl group in $R^{23}$ may be a linear alkyl group or a branched alkyl group, and is preferably a linear alkyl group.

The olefin-(meth)acrylate copolymer (D) may have one structural unit represented by formula (b-1) or may have two or more structural units represented by formula (b-1).

To improve fluidity, the amount of the structural unit represented by formula (b-1) in the olefin-(meth)acrylate copolymer (D) may be 55 mass % or more and 85 mass % or less (preferably 65 mass % or more and 85 mass % or less, more preferably 68 mass % or more and 80 mass % or less) relative to the total amount of the olefin-(meth)acrylate copolymer (D).

The olefin-(meth)acrylate copolymer (D) may have another structural unit other than the structural unit represented by formula (a-1) or (b-1), but preferably does not have another structural unit. In other words, the olefin-(meth)acrylate copolymer (D) is preferably a copolymer having the structural units represented by the formulas (a-1) and (b-1).

When the olefin-(meth)acrylate copolymer (D) has another structural unit, the monomer for forming another structural unit may be any known ethylenically unsaturated compound except for the above-described ethylenically unsaturated compounds.

Specific examples of the monomer for forming another structural unit include a styrene compound, a vinyl ether compound, a vinyl ester compound, and a (meth)acrylate compound other than the above-described (meth)acrylate compounds. These compounds may be used alone or in combination of two or more.

When the olefin-(meth)acrylate copolymer (D) has another structural unit, the amount of another structural unit may be 10 mass % or less (preferably 5 mass % or less, more preferably 1 mass % or less) relative to the total amount of the olefin-(meth)acrylate copolymer (D).

The terminal structure of the olefin-(meth)acrylate copolymer (D) is not limited, and the olefin-(meth)acrylate copolymer (D) may have, at its terminal, various groups according to the reaction conditions and the type of reaction terminator. Examples of various groups include a hydrogen atom, a hydroxy group, an ethylenically unsaturated group, an alkoxy group, and an alkylthio group.

To improve fluidity, the weight-average molecular weight (Mw) of the olefin-(meth)acrylate copolymer (D) is preferably 5,000 or more and 200,000 or less, and more preferably 10,000 or more and 100,000 or less.

The weight-average molecular weight (Mw) is a value determined by the same measurement method as that for the weight-average molecular weight (Mw) of the cellulose acetate (A) as described above.

The olefin-(meth)acrylate copolymer (D) may be used alone or in combination of two or more.

To improve fluidity, the olefin-(meth)acrylate copolymer (D) is preferably an ethylene-alkyl (meth)acrylate copolymer. Specific examples of the ethylene-alkyl (meth)acrylate copolymer include an ethylene-methyl (meth)acrylate copolymer, an ethylene-ethyl (meth)acrylate copolymer, an ethylene-propyl (meth)acrylate copolymer, and an ethylene-butyl (meth)acrylate copolymer. Among these, an ethylene-methyl (meth)acrylate copolymer or an ethylene-ethyl (meth)acrylate copolymer is preferred, and an ethylene-ethyl acrylate copolymer is more preferred.

The amount of the olefin-(meth)acrylate copolymer (D) (specific copolymer (D)) is preferably about 0.5 parts by mass or more and about 13 parts by mass or less, more preferably about 1 part by mass or more and about 10.5 parts by mass or less, and more preferably about 2 parts by mass or more and about 6 parts by mass or less relative to 100 parts by mass of the cellulose acetate (A).

When the amount of the specific copolymer (D) is about 13 parts by mass or less, the phase separation at the interface between the specific copolymer (D) and the cellulose acetate (A) may be unlikely to occur, and a resin molded body in which delamination is suppressed may tend to be obtained. When the amount of the specific copolymer (D) is about 0.5 parts by mass or more, the fluidity may tend to be improved.

The specific copolymer (D) may be used alone or in combination of two or more.

In the resin composition according to the exemplary embodiment, the ratio (the amount of (C)/the amount of (D)) of the amount of the polyhydroxyalkanoate (C) to the amount of the specific copolymer (D) is preferably, in terms of mass ratio, 2/4 or more and 1/1 or less, and more preferably 1/1.5 or more and 7/10 or less.

In the resin composition according to the exemplary embodiment, the ratio (the amount of (A)/the total amount of (C) and (D)) of the amount of the cellulose acetate (A) to the total amount of the polyhydroxyalkanoate (C) and the specific copolymer (D) is preferably, in terms of mass ratio, 100/20 or more and 100/1 or less, and more preferably 100/17 or more and 100/2 or less in order to reduce the size of domains that may be formed with increasing amounts of other resin components relative to the cellulose acetate (A). When the ratio is in this range, the fluidity may tend to be improved.

Other Components

The resin composition according to the exemplary embodiment may further contain components other than the above-described components as needed. Examples of other components include a flame retardant, a compatibilizer, an antioxidant, a release agent, a light resisting agent, a weathering agent, a colorant, a pigment, a modifier, an anti-drip agent, an antistatic agent, a hydrolysis inhibitor, a filler, and reinforcing agents (e.g., glass fiber, carbon fiber, talc, clay, mica, glass flake, milled glass, glass beads, crystalline silica, alumina, silicon nitride, aluminum nitride, and boron nitride).

As needed, components (additives), such as a reactive trapping agent and an acid acceptor for avoiding release of acetic acid, may be added. Examples of the acid acceptor include oxides, such as magnesium oxide and aluminum oxide; metal hydroxides, such as magnesium hydroxide, calcium hydroxide, aluminum hydroxide, and hydrotalcite; calcium carbonate; and talc.

Examples of the reactive trapping agent include epoxy compounds, acid anhydride compounds, and carbodiimides.

The amount of each of these components may be 0 mass % or more and 5 mass % or less relative to the total amount of the resin composition. The expression "0 mass %" means that the resin composition is free of a corresponding one of other components.

The resin composition according to the exemplary embodiment may contain resins other than the above-described resins (the cellulose acetate (A), the polyhydroxyalkanoate (C), and the specific copolymer (D)). The proportion of other resins relative to all resins is preferably 5 mass % or less.

Examples of other resins include thermoplastic resins known in the art. Specific examples include polycarbonate resin; polypropylene resin; polyester resin; polyolefin resin; polyester-carbonate resin; polyphenylene ether resin; polyphenylene sulfide resin; polysulfone resin; polyether sulfone resin; polyarylene resin; polyetherimide resin; polyacetal resin; polyvinyl acetal resin; polyketone resin; polyether ketone resin; polyether ether ketone resin; polyaryl ketone resin; polyether nitrile resin; liquid crystal resin; polybenzimidazole resin; polyparabanic acid resin; a vinyl polymer or vinyl copolymer produced by polymerizing or copolymerizing at least one vinyl monomer selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenylmaleimide copolymer; a vinyl cyanide-(ethylene-diene-propylene (EPDM))-aromatic alkenyl compound copolymer; polyvinyl chloride resin; and chlorinated polyvinyl chloride resin. Examples further include a core shell-type butadiene-methyl methacrylate copolymer. These resins may be used alone or in combination of two or more.

Method for Producing Resin Composition

The resin composition according to the exemplary embodiment is produced by, for example, melt-kneading a mixture containing the cellulose acetate (A), the plasticizer (B), the polyhydroxyalkanoate (C), the specific copolymer (D), and as needed, other components. In addition, the resin composition according to the exemplary embodiment is also produced by, for example, dissolving the above-described components in a solvent.

An apparatus used for melt kneading is, for example, a known apparatus. Specific examples of the apparatus include a twin-screw extruder, a Henschel mixer, a Banbury mixer, a single-screw extruder, a multi-screw extruder, and a co-kneader.

The kneading temperature depends on the temperature for melting cellulose acetate (A) used, and is preferably, for example, 140° C. or higher and 240° C. or lower, and more preferably 160° C. or higher and 200° C. or lower in view of thermal decomposition and fluidity.

Resin Molded Body

A resin molded body according to an exemplary embodiment is formed of the resin composition according to the exemplary embodiment. In other words, a resin molded body according to an exemplary embodiment is produced by molding a resin composition containing the cellulose acetate (A), the plasticizer (B), the polyhydroxyalkanoate (C), and the specific copolymer (D).

Examples of the molding method that may be used include injection molding, extrusion molding, blow molding, hot press molding, calendar molding, coating molding, cast molding, dipping molding, vacuum molding, and transfer molding.

The method for forming the resin molded body according to the exemplary embodiment may be injection molding in terms of a high degree of freedom in shape. For injection molding, the resin composition is melted by application of heat, and the melted resin composition is poured into a mold and solidified to form a molded body. The resin molded body according to the exemplary embodiment may be formed by injection compression molding.

The cylinder temperature during injection molding is preferably 140° C. or higher and 240° C. or lower, more preferably 150° C. or higher and 220° C. or lower, and still more preferably 160° C. or higher and 220° C. or lower. The mold temperature during injection molding is preferably 30° C. or higher and 120° C. or lower, and more preferably 40° C. or higher and 80° C. or lower. Injection molding may be performed using a commercially available apparatus, such as NEX 500 available from Nissei Plastic Industrial Co., Ltd., NEX 150 available from Nissei Plastic Industrial Co., Ltd., NEX 70000 available from Nissei Plastic Industrial Co., Ltd., or SE50D available from Sumitomo Heavy Industries, Ltd.

The resin molded body according to the exemplary embodiment is used in various applications, such as electrical and electronic devices, office machines, home appliances, automotive interior materials, and containers. More specifically, the resin molded body is used for housings of electrical and electronic devices and home appliances; various parts of electrical and electronic devices and home appliances; automotive interior parts; cases for CD-ROMs, DVDs, and the like; tableware; drink bottles; food trays; wrapping materials; films; and sheets.

EXAMPLES

The present invention will be described below in more detail by way of Examples, but the present invention is not limited by these Examples. The unit "part(s)" refers to "part(s) by mass" unless otherwise specified.

Preparation of Cellulose Acetate (A)

Commercially available cellulose acetates CA1 to CA3 are provided as the cellulose acetate (A). The details are described below.

Cellulose acetate CA1 (L50 available from Daicel Corporation)

Cellulose acetate CA2 (L20 available from Daicel Corporation)

Cellulose acetate CA3 (CA398-3 available from Eastman Chemical Company)

Measurement of Weight-Average Molecular Weight (Mw), Degree of Polymerization, and Degree of Substitution The weight-average molecular weight (Mw) and the degree of substitution of cellulose acetate are measured by the above-described methods. The degree of polymerization of cellulose acetate is obtained by dividing the weight-average molecular weight (Mw) of cellulose acetate by the molecular weight of the structural unit of cellulose acetate. The molecular weight of the structural unit is, for example, 263 when the degree of polymerization with an acetyl group is 2.4, and 287 when the degree of polymerization is 2.9. The weight-average molecular weight (Mw), the degree of polymerization, and the degree of substitution of cellulose acetate measured are summarized in Table 1.

TABLE 1

| Cellulose Acetate No. | Weight-Average Molecular Weight (Mw) | Degree of Polymerization | Degree of Substitution |
|---|---|---|---|
| CA1 | 160,000 | 607 | 2.41 |
| CA2 | 117,800 | 447 | 2.41 |
| CA3 | 79,000 | 300 | 2.40 |

Preparation of Plasticizer (B)

Commercially available plasticizers P1 and P2 are provided as the plasticizer (B). The details are described below.

Plasticizer P1: adipic acid ester-containing compound (Daifatty-101 available from Daihachi Chemical Industry Co., Ltd.)

Plasticizer P2: polyether ester compound (RS-1000 available from Adeka Corporation)

Preparation of Polyhydroxyalkanoate (C)

Commercially available polyhydroxyalkanoates HA1 and HA2 are provided as the polyhydroxyalkanoate (C). The details are described below.

Polyhydroxyalkanoate HA1: 3-hydroxybutyrate-co-3-hydroxyhexanoate (copolymer of 3-hydroxybutyric acid and 3-hydroxyhexanoic acid) (Aonilex X151A available from Kaneka Corporation)

Polyhydroxyalkanoate HA2: polylactic acid (Terramac TE2000 available from Unitika Ltd.)

The weight-average molecular weight of the polyhydroxyalkanoates HA1 to HA2 and the alkylene group ($R^{11}$ in formula (I)) in the structural unit of each polyhydroxyalkanoate are summarized in Table 2.

In the polyhydroxyalkanoate HA1, the ratio ([—O($C_3H_6$)CO—]/[—O($C_5H_{10}$)CO—]) of the structural unit derived from 3-hydroxybutyrate to the structural unit derived from 3-hydroxyhexanoate is 90/10 in terms of mass ratio.

TABLE 2

| Polyhydroxy-alkanoate No. | Type | $R^{11}$ in Formula (I) | Weight-Average Molecular Weight (Mw) |
|---|---|---|---|
| HA1 | poly(3-hydroxybutyrate-co-3-hydroxyhexanoate) | propylene group/pentylene group | 600,000 |
| HA2 | polylactic acid | —CH(CH$_3$)— | 120,000 |

Preparation of Olefin-(Meth)acrylate Copolymer (D) (Specific Copolymer (D))

The following copolymers EA1 to EA4 are provided as the specific copolymer (D). The details are described below.

Ethylene-methyl acrylate copolymer EA1 (LOTRYL 29MA03 available from Arkema K.K.)

Ethylene-methyl acrylate copolymer EA2 (LOTRYL 18MA02 available from Arkema K.K.)

Ethylene-ethyl acrylate copolymer EA3 (NUC-6070 available from NUC Corporation)

Ethylene-ethyl acrylate copolymer EA4 (NUC-6170 available from NUC Corporation)

The amount (mass %) of each structural unit in the provided copolymers EA1 to EA4 is summarized in Table 3.

TABLE 3

| | Olefin-(Meth)acrylate Copolymer | | |
|---|---|---|---|
| | ethylene | alkyl (meth)acrylate | |
| No. | amount (mass %) | type | amount (mass %) |
| EA1 | 71 | MA | 29 |
| EA2 | 82 | MA | 18 |
| EA3 | 75 | EA | 25 |
| EA4 | 82 | EA | 18 |

In Table 3, "MA" represents methyl acrylate, and "EA" represents ethyl acrylate.

Examples 1 to 12, Comparative Examples 1 to 6

Kneading and Injection Molding

Each resin composition (pellets) is produced by performing kneading with a twin-screw kneader (TEM-41SS available from Toshiba Machine Co., Ltd.) at the preparation composition ratio shown in Table 4 and the cylinder temperature adjusted according to Table 4.

The produced pellets are molded into an ISO-D2 test piece (2 mm thick) using an injection molding machine (NEX 50I available from Nissei Plastic Industrial Co., Ltd.) at a cylinder temperature at which the injection peak pressure does not exceed 100 MPa.

Evaluation

Fluidity

The fluidity is evaluated by measuring the melt viscosity.

Specifically, the melt viscosity of the produced resin composition (pellets) at a shear rate of 1216/sec at a barrel temperature of 220° C. is measured with a capillary rheometer (Capirograph 3D available from Toyo Seiki Seisakusho, Ltd.) using a method in conformity with JIS K7199 (1999) and evaluated on the basis of the following criterion. The fluidity is higher as the melt viscosity is lower.

The results are shown in Table 4.

Evaluation Criterion

A: the melt viscosity is 400 Pa·s or less.

B: the melt viscosity is more than 400 Pa·s.

C: unmeasurable

Delamination

The produced D2 test piece is subjected to a bending test using a method in conformity with ISO 178 with a universal tester "Autograph AG-Xplus available from Shimadzu Corporation" until the D2 test piece fractures. When delamination of remaining thin layers occurs on the fracture surface of the D2 test piece, delamination is then determined to be "present". When delamination does not occur, delamination is determined to be "absent".

The results are shown in Table 4.

Bleeding Property

The produced D2 test piece is left to stand in an atmosphere at 65° C. and 85% RH (relative humidity) for 100 hours. When deposits are found on the surface of the D2 test piece through macroscopic observation, bleeding is then determined to be "present". When no deposit is found, bleeding is determined to be "absent".

The results are shown in Table 4.

TABLE 4

| Run no. | CA (A) type | CA (A) amount (parts by mass) | plasticizer (B) type | plasticizer (B) amount (parts by mass) | PHA (C) type | PHA (C) amount (parts by mass) | specific copolymer (D) type | specific copolymer (D) amount (parts by mass) | Cylinder temperature (° C.) kneading | Cylinder temperature (° C.) injection molding | Fluidity melt viscosity (Pa · s) | Fluidity results | Delamination present or absent | Bleeding property present or absent |
|---|---|---|---|---|---|---|---|---|---|---|---|---|---|---|
| Example 1 | CA3 | 100 | P1 | 15 | HA1 | 2 | EA3 | 2 | 230 | 240 | 250 | A | absent | absent |
| Example 2 | CA3 | 100 | P1 | 10 | HA1 | 1 | EA3 | 1 | 240 | 250 | 400 | A | absent | absent |
| Example 3 | CA3 | 100 | P1 | 20 | HA1 | 7 | EA3 | 10 | 220 | 230 | 150 | A | absent | absent |
| Example 4 | CA1 | 100 | P1 | 15 | HA1 | 3 | EA3 | 4 | 230 | 240 | 400 | A | absent | absent |
| Example 5 | CA2 | 100 | P1 | 15 | HA1 | 3 | EA3 | 4 | 230 | 240 | 370 | A | absent | absent |
| Example 6 | CA3 | 100 | P2 | 15 | HA1 | 3 | EA3 | 4 | 230 | 240 | 300 | A | absent | absent |
| Example 7 | CA3 | 100 | P1 | 15 | HA2 | 3 | EA3 | 4 | 230 | 240 | 230 | A | absent | absent |
| Example 8 | CA3 | 100 | P1 | 15 | HA1 | 3 | EA1 | 4 | 230 | 240 | 290 | A | absent | absent |
| Example 9 | CA3 | 100 | P1 | 15 | HA1 | 3 | EA2 | 4 | 230 | 240 | 290 | A | absent | absent |
| Example 10 | CA3 | 100 | P1 | 15 | HA1 | 3 | EA4 | 4 | 230 | 240 | 280 | A | absent | absent |
| Example 11 | CA3 | 100 | P1 | 25 | HA1 | 3 | EA3 | 4 | 220 | 230 | 200 | A | absent | present |
| Example 12 | CA3 | 100 | P1 | 15 | HA1 | 3 | EA3 | 4 | 230 | 240 | 210 | A | absent | absent |
| Comparative Example 1 | CA3 | 100 | P1 | — | HA1 | 5 | EA3 | 5 | 260 | 260 | unmeasurable | C | absent | absent |
| Comparative Example 2 | CA3 | 100 | P1 | 15 | HA1 | — | EA3 | — | 230 | 240 | 800 | B | absent | absent |
| Comparative Example 3 | CA3 | 100 | P1 | 15 | HA1 | 8 | EA3 | — | 230 | 240 | 600 | B | present | absent |
| Comparative Example 4 | CA3 | 100 | P1 | 15 | HA1 | — | EA3 | 11 | 230 | 240 | 600 | B | present | absent |
| Comparative Example 5 | CA3 | 100 | P1 | 15 | HA1 | 3 | EA3 | — | 230 | 240 | 600 | B | absent | absent |
| Comparative Example 6 | CA3 | 100 | P1 | 15 | HA2 | 3 | EA3 | — | 230 | 240 | 550 | B | absent | absent |

In Table 4, "PHA" represents a polyhydroxyalkanoate.

The above results indicate that the resin compositions according to Examples have better fluidity than those according to Comparative Examples.

It is also found that delamination is suppressed in the resin molded bodies formed of the resin compositions according to Examples. It is further found that bleeding is suppressed in the resin molded bodies formed of the resin compositions according to Examples 1 to 10 and 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   cellulose acetate (A) having a degree of substitution of about 2.1 or more and about 2.6 or less;
   a plasticizer (B);
   a polyhydroxyalkanoate (C); and
   an olefin-(meth)acrylate copolymer (D).

2. The resin composition according to claim 1, wherein the plasticizer (B) is at least one selected from the group consisting of an adipic acid ester-containing compound and a polyether ester compound.

3. The resin composition according to claim 1, wherein the polyhydroxyalkanoate (C) has a structural unit represented by formula (I) below:

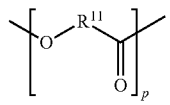

in formula (I), $R^{11}$ represents an alkylene group having 1 or more and 10 or less carbon atoms, and p represents an integer of 1 or more.

4. The resin composition according to claim 1, wherein the polyhydroxyalkanoate (C) is a copolymer of 3-hydroxybutyrate and 3-hydroxyhexanoate.

5. The resin composition according to claim 1, wherein the olefin-(meth)acrylate copolymer (D) is an ethylene-alkyl (meth)acrylate copolymer.

6. The resin composition according to claim 1, wherein the olefin-(meth)acrylate copolymer (D) is an ethylene-ethyl acrylate copolymer.

7. The resin composition according to claim 1, wherein the resin composition comprises about 5 parts by mass or more and about 23 parts by mass or less of the plasticizer (B) relative to 100 parts by mass of the cellulose acetate (A).

8. The resin composition according to claim 1, wherein the resin composition comprises about 0.5 parts by mass or more and about 10 parts by mass or less of the polyhydroxyalkanoate (C) relative to 100 parts by mass of the cellulose acetate (A).

9. The resin composition according to claim 1, wherein the resin composition comprises about 1 part by mass or more and about 7.5 parts by mass or less of the polyhydroxyalkanoate (C) relative to 100 parts by mass of the cellulose acetate (A).

10. The resin composition according to claim 1, wherein the resin composition comprises about 0.5 parts by mass or more and about 13 parts by mass or less of the olefin-(meth)acrylate copolymer (D) relative to 100 parts by mass of the cellulose acetate (A).

11. The resin composition according to claim 1, wherein the resin composition comprises about 1 part by mass or more and about 10.5 parts by mass or less of the olefin-(meth)acrylate copolymer (D) relative to 100 parts by mass of the cellulose acetate (A).

12. The resin composition according to claim 1, wherein a percentage of the cellulose acetate (A) in a total amount of the resin composition is about 50 mass % or more and about 95 mass % or less.

13. A resin molded body formed of the resin composition according to claim 1.

* * * * *